(12) United States Patent
Morford et al.

(10) Patent No.: US 7,797,944 B2
(45) Date of Patent: Sep. 21, 2010

(54) GAS TURBINE ENGINE HAVING SLIM-LINE NACELLE

(75) Inventors: Stephen A. Morford, Marlborough, CT (US); Michael J. Larkin, Rocky Hill, CT (US)

(73) Assignee: United Technologies Corporation, Hartford, CT (US)

( * ) Notice: Subject to any disclaimer, the term of this patent is extended or adjusted under 35 U.S.C. 154(b) by 1006 days.

(21) Appl. No.: 11/584,030

(22) Filed: Oct. 20, 2006

(65) Prior Publication Data

US 2008/0092548 A1 Apr. 24, 2008

(51) Int. Cl.
F02K 1/00 (2006.01)
(52) U.S. Cl. .................. 60/771; 239/265.39
(58) Field of Classification Search ............ 60/226.1, 60/771; 239/265.33, 265.37, 265.39; 244/53 B
See application file for complete search history.

(56) References Cited

U.S. PATENT DOCUMENTS

| | | | |
|---|---|---|---|
| 3,222,863 A | 12/1965 | Klees et al. | |
| 3,568,694 A | 3/1971 | Johnson | |
| 3,664,612 A | 5/1972 | Skidmore et al. | |
| 4,044,973 A | 8/1977 | Moorehead | |
| 4,083,181 A | 4/1978 | Adamson | |
| 4,147,029 A | 4/1979 | Sargisson | |
| 4,722,357 A | 2/1988 | Wynosky | |
| 4,865,268 A | 9/1989 | Tracksdorf | |
| 4,899,958 A | 2/1990 | Horikawa | |
| 4,912,921 A * | 4/1990 | Rice et al. | 60/774 |
| 4,993,663 A | 2/1991 | Lahti et al. | |
| 5,000,399 A | 3/1991 | Readnour et al. | |
| 5,012,639 A | 5/1991 | Ream et al. | |
| 5,058,617 A | 10/1991 | Stockman et al. | |
| 5,127,222 A | 7/1992 | Ream et al. | |
| 5,143,329 A | 9/1992 | Coffinberry | |
| 5,145,126 A | 9/1992 | Patilla | |
| 5,177,957 A | 1/1993 | Grieb | |
| 5,261,227 A * | 11/1993 | Giffin, III | 60/226.1 |
| 5,284,012 A | 2/1994 | Laborie et al. | |
| 5,297,765 A | 3/1994 | Hughes et al. | |
| 5,351,476 A | 10/1994 | Laborie et al. | |
| 5,447,283 A * | 9/1995 | Tindell | 244/207 |

(Continued)

FOREIGN PATENT DOCUMENTS

GB 1312619 4/1973

(Continued)

OTHER PUBLICATIONS

Extended European Search Report for Application No. 08252429.9 mailed Nov. 26, 2008.

(Continued)

*Primary Examiner*—Michael Cuff
*Assistant Examiner*—Phutthiwat Wongwian
(74) *Attorney, Agent, or Firm*—Carlson, Gaskey & Olds

(57) ABSTRACT

A nacelle assembly for a gas turbine engine includes a nacelle, a variable area fan nozzle, a sensor that detects a windmilling condition and a controller that communicates with the sensor. The variable area fan nozzle is moveable between a first position having a first discharge airflow area and a second position having a second discharge airflow area greater than the first discharge airflow area in response to detecting the windmilling condition.

14 Claims, 5 Drawing Sheets

U.S. PATENT DOCUMENTS

| | | | |
|---|---|---|---|
| 5,586,431 | A | 12/1996 | Thonebe et al. |
| 5,593,112 | A | 1/1997 | Maier et al. |
| 5,743,488 | A | 4/1998 | Rolston et al. |
| 5,987,880 | A | 11/1999 | Culbertson |
| 6,089,505 | A | 7/2000 | Gruensfelder et al. |
| 6,109,566 | A | 8/2000 | Miller et al. |
| 6,129,311 | A | 10/2000 | Welch et al. |
| 6,179,251 | B1 | 1/2001 | Tindell et al. |
| 6,260,567 | B1 | 7/2001 | Gruensfelder et al. |
| 6,334,753 | B1 | 1/2002 | Tillman et al. |
| 6,340,135 | B1 | 1/2002 | Barton |
| 6,360,989 | B1 | 3/2002 | Maguire |
| 6,379,110 | B1 | 4/2002 | McCormick et al. |
| 6,390,418 | B1 | 5/2002 | McCormick et al. |
| 6,651,929 | B2 | 11/2003 | Dionne |
| 6,655,632 | B1 | 12/2003 | Gupta et al. |
| 6,708,711 | B2 | 3/2004 | Surply et al. |
| 6,764,043 | B2 | 7/2004 | Sankrithi et al. |
| 6,971,229 | B2 | 12/2005 | Lair |
| 7,048,229 | B2 | 5/2006 | Sanders et al. |
| 7,090,165 | B2 | 8/2006 | Jones et al. |
| 7,131,612 | B2 | 11/2006 | Baptist et al. |
| 7,165,744 | B2 | 1/2007 | Howarth et al. |
| 7,617,670 | B2 | 11/2009 | Truax et al. |

FOREIGN PATENT DOCUMENTS

| | | |
|---|---|---|
| GB | 1336724 | 11/1973 |
| GB | 1382809 | 2/1975 |

OTHER PUBLICATIONS

U.S. Appl. No. 11/739,216, filed Apr. 27, 2007, Jain, et al.
U.S. Appl. No. 11/595,040, filed Nov. 10, 2006, Winter, et al.
U.S. Appl. No. 11/749,260, filed May 16, 2007, Jain, et al.
U.S. Appl. No. 11/750,398, filed May 18, 2007, Jain, et al.
U.S. Appl. No. 11/772,287, filed Jul. 2, 2007, Jain, et al.
U.S. Appl. No. 11/769,749, filed Jun. 28, 2007, Jain, et al.

* cited by examiner

GAS TURBINE ENGINE HAVING SLIM-LINE NACELLE

BACKGROUND OF THE INVENTION

This invention generally relates to a gas turbine engine, and more particularly to a nacelle for a turbofan gas turbine engine.

In an aircraft gas turbine engine, such as a turbofan engine, air is pressurized in a compressor and mixed with fuel in a combustor for generating hot combustion gases. The hot combustion gases flow downstream through turbine stages that extract energy from the gases. In a two spool gas turbine engine, a high pressure turbine powers the high pressure compressor, while a low pressure turbine powers a fan disposed upstream of the compressor and a low pressure compressor.

Combustion gases are discharged from the turbofan engine through a core exhaust nozzle, and fan air is discharged through an annular fan exhaust nozzle defined at least partially by a nacelle surrounding the core engine. A majority of propulsion thrust is provided by the pressurized fan air which is discharged through the fan exhaust nozzle, while the remaining thrust provided from the combustion gases is discharged through the core exhaust nozzle.

In high bypass turbofans a majority of the air pressurized by the fan bypasses the turbofan engine for generating propulsion thrust. High bypass turbofans typically use large diameter fans to achieve adequate turbofan engine efficiency. Therefore, the nacelle of the turbofan engine must be large enough to support the large diameter fan of the turbofan engine. Disadvantageously, the relatively large size of the nacelle results in increased weight and drag that may offset the propulsive efficiency achieved by high bypass turbofan engines.

Accordingly, it is desirable to optimize the performance of a gas turbine engine during diverse flight requirements to provide a nacelle having a reduced maximum diameter, reduced weight, and reduced drag.

SUMMARY OF THE INVENTION

A nacelle assembly for a gas turbine engine includes a nacelle, a variable area fan nozzle, a sensor that detects a windmilling condition and a controller that communicates with the sensor. The variable area fan nozzle is moveable between a first position having a first discharge airflow area and a second position having a second discharge airflow area greater than the first discharge airflow area in response to detecting the windmilling condition.

A gas turbine engine system includes a nacelle having a variable area fan nozzle, a core cowl within a fan cowl of the nacelle, a boundary layer control device, a turbofan, at least one compressor and at least one turbine positioned downstream of the turbofan, a combustor, a sensor that senses a windmilling condition, and a controller in communication with the sensor and operable to move the variable area fan nozzle to influence a discharge airflow area of the nacelle. The first boundary layer control device is positioned near one of an inlet lip section and an inlet internal diffuser section of the nacelle.

A method of providing a slim-line nacelle for a gas turbine engine includes the steps of detecting a windmilling condition and increasing a discharge airflow area of a variable area fan nozzle in response to the detection of the windmilling condition.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
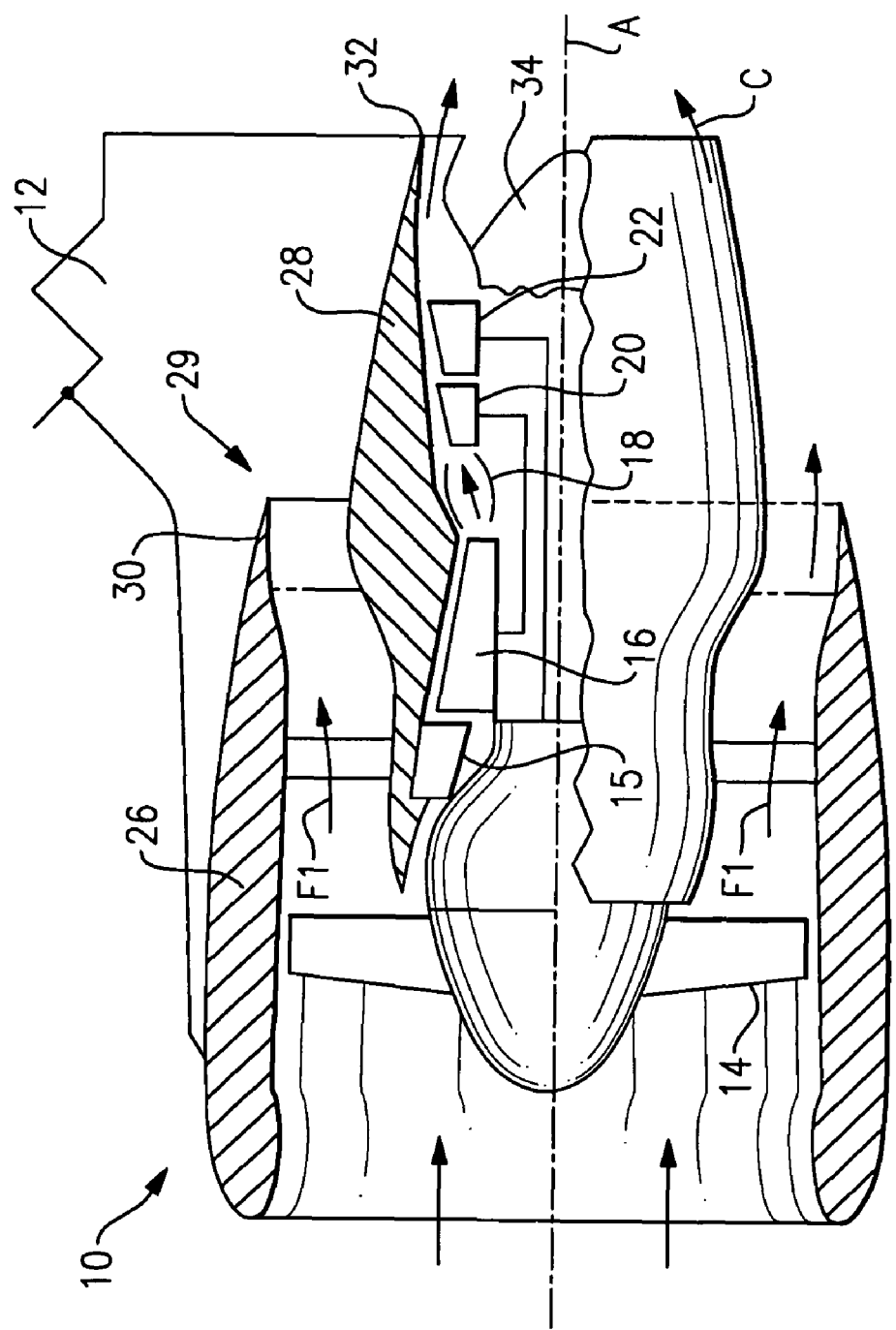
FIG. 1 illustrates a general prospective view of a gas turbine engine.

Referring to FIG. 1, a gas turbine engine 10 typically includes (in serial flow communication) a fan 14, a low pressure compressor 15, a high pressure compressor 16, a combustor 18, a high pressure turbine 20 and a low pressure turbine 22. During operation, air is pressurized in the compressors 15, 16 and mixed with fuel in the combustor 18 for generating hot combustion gases. The hot combustion gases flow through the high and low pressure turbines 20, 22 which extract energy from the hot combustion gases. The high pressure turbine 20 powers the high pressure compressor 16 through a shaft defined therebetween, and the low pressure turbine 22 powers the fan 14 and the low pressure compressor 15 through another shaft defined therebetween. The invention is not limited to the two spool axial gas turbine architecture described and may be used with other architectures, such as a single spool axial design, a three spool axial design and other architectures.

The gas turbine engine 10 is in the form of a high bypass ratio turbofan engine mounted within a nacelle assembly 26, in which most of the air pressurized by the fan 14 bypasses the core engine itself for the generation of propulsion thrust. The nacelle assembly 26 includes a fan cowl 46 and a core cowl 28 within the fan cowl 46. Fan discharge airflow F1 is discharged from the engine 10 through a variable area fan nozzle (VAFN) 30 defined radially between the core cowl 28 and the fan cowl 46. Core exhaust gases C are discharged from the core engine through a core exhaust nozzle 32 defined between the core cowl 28 and a center plug 34 disposed coaxially therein around a longitudinal centerline axis A of the gas turbine engine 10.

The VAFN 30 concentrically surrounds the core cowl 28 near an aftmost segment 29 of the nacelle assembly 26. The VAFN 30 of the nacelle assembly 26 defines a fan-nozzle discharge airflow area 36 (FIG. 2) between the fan cowl 46 and the core cowl 28 for axially discharging the fan discharge airflow F1 pressurized by the upstream fan 14.

Figure 2:
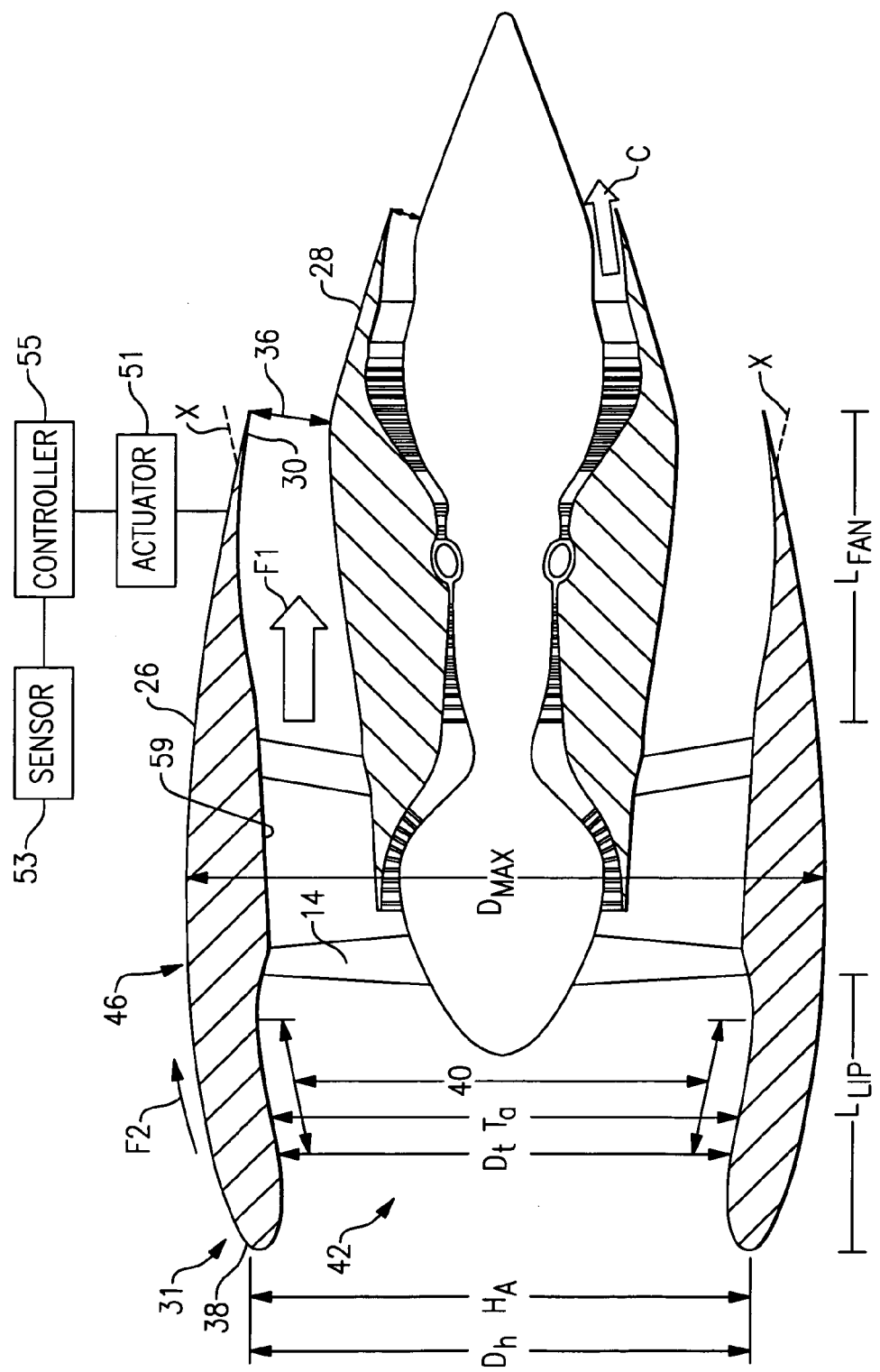
FIG. 2 is a schematic view of a gas turbine engine having a variable area fan nozzle (VAFN)

Referring to FIG. 2, the nacelle assembly 26 defines an inlet lip section 38 and an inlet internal diffuser section 40. The inlet lip section 38 is positioned near a forward segment 31 of the fan cowl 46. The inlet internal diffuser section 40 is defined between a throat 42 of the fan cowl 46 and a forward face of the fan 14. The fan cowl 46 defines an outer surface of the nacelle assembly 26. The nacelle assembly 26 also defines a highlight diameter $D_h$ and a maximum diameter $D_{max}$. The highlight diameter $D_h$ represents the diameter defined by the inlet lip section 38 of the nacelle assembly 26. The maximum diameter $D_{max}$ represents the peak diameter of the nacelle assembly 26. The throat 42 of the nacelle assembly 26 also defines a throat diameter $D_t$.

The maximum diameter $D_{max}$ of the nacelle assembly 26 may be established by Extended-Range Twin-Engine Operational Performance Standards (ETOPS) requirements, in which an external airflow F2 over the fan cowl 46 is required to remain separation free under an engine-out windmilling condition or other condition. ETOPS requirements are aircraft performance standards established by the International Civil Aviation Organization. It is desirable from an engine efficiency standpoint for the external airflow F2 to maintain attached to the fan cowl 46 during aircraft operation. A windmilling condition occurs where an engine of a twin-engine aircraft loses functionality (i.e. engine out condition). The damaged engine is advantageously permitted to rotate, and is driven by an airflow resulting from the forward velocity of the aircraft (i.e., the damaged engine is permitted to "windmill").

A diameter ratio, or the ratio of the highlight diameter $D_h$ to the maximum diameter $D_{max}$, is utilized to determine whether the nacelle assembly 26 achieves this ETOPS requirement and maintains an external airflow F2 which is separation free from the fan cowl 46. Current industry standards typically use a diameter ratio of at least approximately 0.80 to achieve a separation free airflow, but other diameter ratios may be feasible.

The nacelle assembly 26 also defines a contraction ratio. The contraction ratio represents a relative thickness of the inlet lip section 38 of the nacelle assembly 26 and is represented by the ratio of a highlight area $H_a$ (ring-shaped area defined by highlight diameter $D_h$) and a throat area $T_a$ (ring-shaped area defined by throat diameter $D_t$) of the nacelle assembly 26. Current industry standards typically use a contraction ratio of approximately 1.300 to prevent the separation of the fan discharge airflow F1 from an interior wall 59 of the fan cowl 46, but other contraction ratios may be feasible. "Thick" inlet lip section designs, which are associated with large contraction ratios, increase the maximum diameter and increase the weight and the drag penalties associated with the nacelle assembly 26. The nacelle assembly 26 further defines an inlet lip length $L_{lip}$ and a fan duct length $L_{fan}$.

Increasing the fan discharge airflow F1 during specific flight conditions allows the external airflow F2 to remain separation free from the fan cowl 46 while achieving a slim-line nacelle design. In one example, the increased fan discharge airflow F1 is achieved by providing the gas turbine engine 10 with a VAFN 30 and increasing the discharge airflow area 36 of the VAFN 30 during the specific flight conditions.

Figure 3:
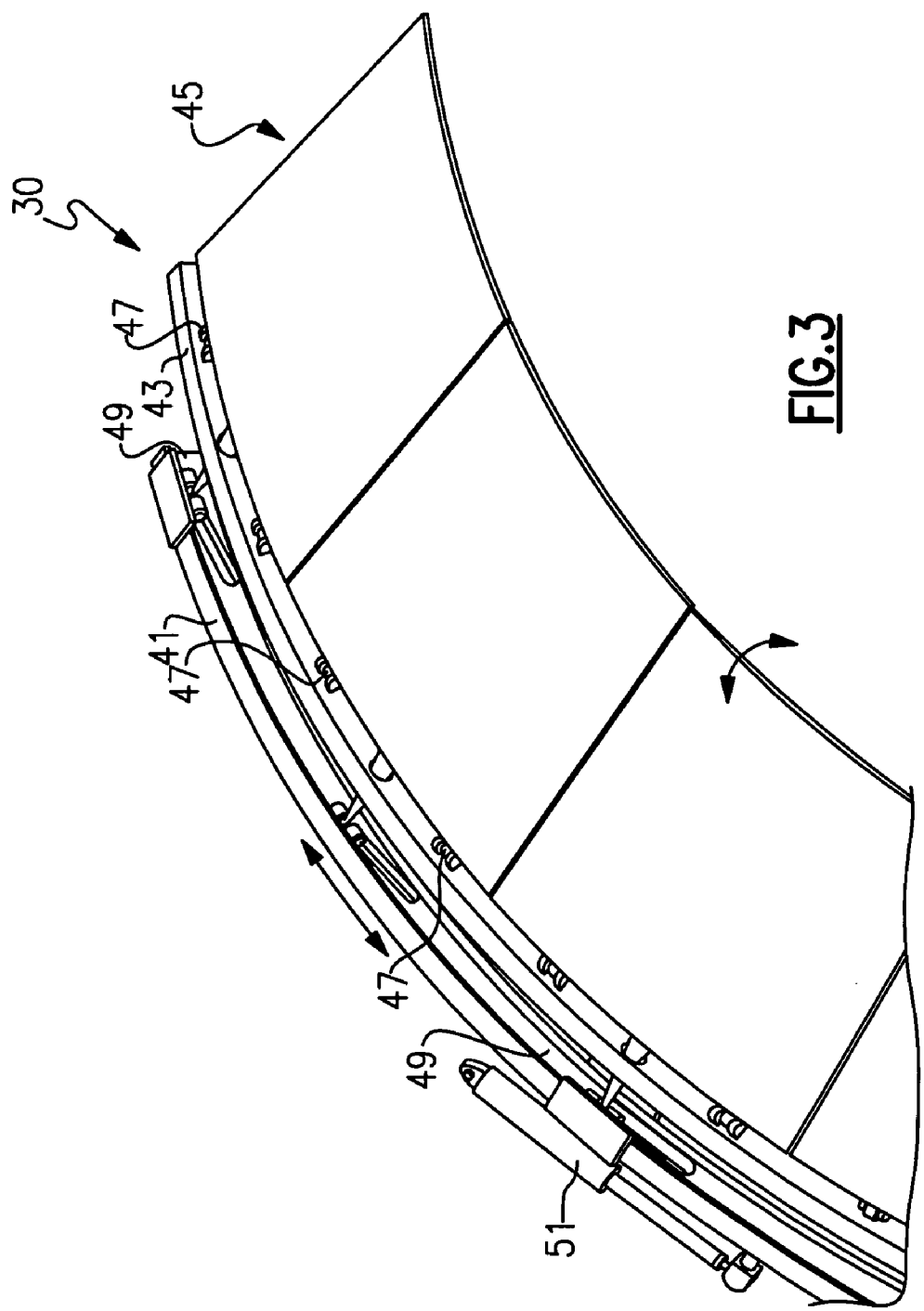
FIG. 3 is a perspective view of a section of the VAFN.

In one example, the increase in the discharge airflow area 36 is achieved by opening the VAFN 30. For example, the VAFN 30 generally includes a synchronizing ring 41, a static ring 43, and a flap assembly 45 (See FIG. 3). Other VAFN designs and actuation mechanisms may be used. The flap assembly 45 is pivotally mounted to the static ring 43 at a multitude of hinges 47 and linked to the synchronizing ring 41 through a linkage 49. An actuator assembly 51 (only one shown in FIG. 3) selectively rotates the synchronizing ring 41 relative the static ring 43 to adjust the flap assembly 45 through the linkage 49. The radial movement of the synchronizing ring 41 is converted to tangential movement of the flap assembly 44 to vary the discharge airflow area 36 defined by the VAFN 30 through which the fan discharge airflow F1 is discharged.

The increase in the discharge airflow area 36 is achieved by moving the VAFN 30 from a first position to a second (or open) position X (represented by dashed lines in FIG. 2) in response to a detected windmilling condition. The discharge airflow area 36 of the second position is greater than the discharge airflow area 36 of the first position. A sensor 53 detects the windmilling condition and communicates with a controller 55 to move the VAFN 30 via the actuator assembly 51. It should be understood that the sensor 53 and the controller 55 may be programmed to detect any known flight condition. In one example, the second position X represents moving the VAFN 30 to approximately 20% of its opening capability during the windmilling condition, although the actual percentage the VAFN 30 is opened will depend on design specific parameters of the gas turbine engine. A person of ordinary skill in the art would know how to design appropriate actuation and control systems to achieve comparable results with an alternative VAFN design. In another example, the increased fan discharge airflow F1 is achieved by providing the gas turbine engine with a variable pitch fan blade.

The opening of the VAFN 30 during windmilling conditions allows for a reduction in the maximum diameter $D_{max}$ of the nacelle assembly 26 while maintaining an external airflow F2 which is separation free from the fan cowl 46. Therefore, the nacelle assembly 26 achieves an improved (i.e. larger) diameter ratio. Further, the improved diameter ratio results in a weight savings and a reduction in nacelle drag (i.e., slim-line nacelle). The VAFN 30 is returned to its first position (represented by solid lines) during normal cruise operation of the aircraft.

Figure 4:
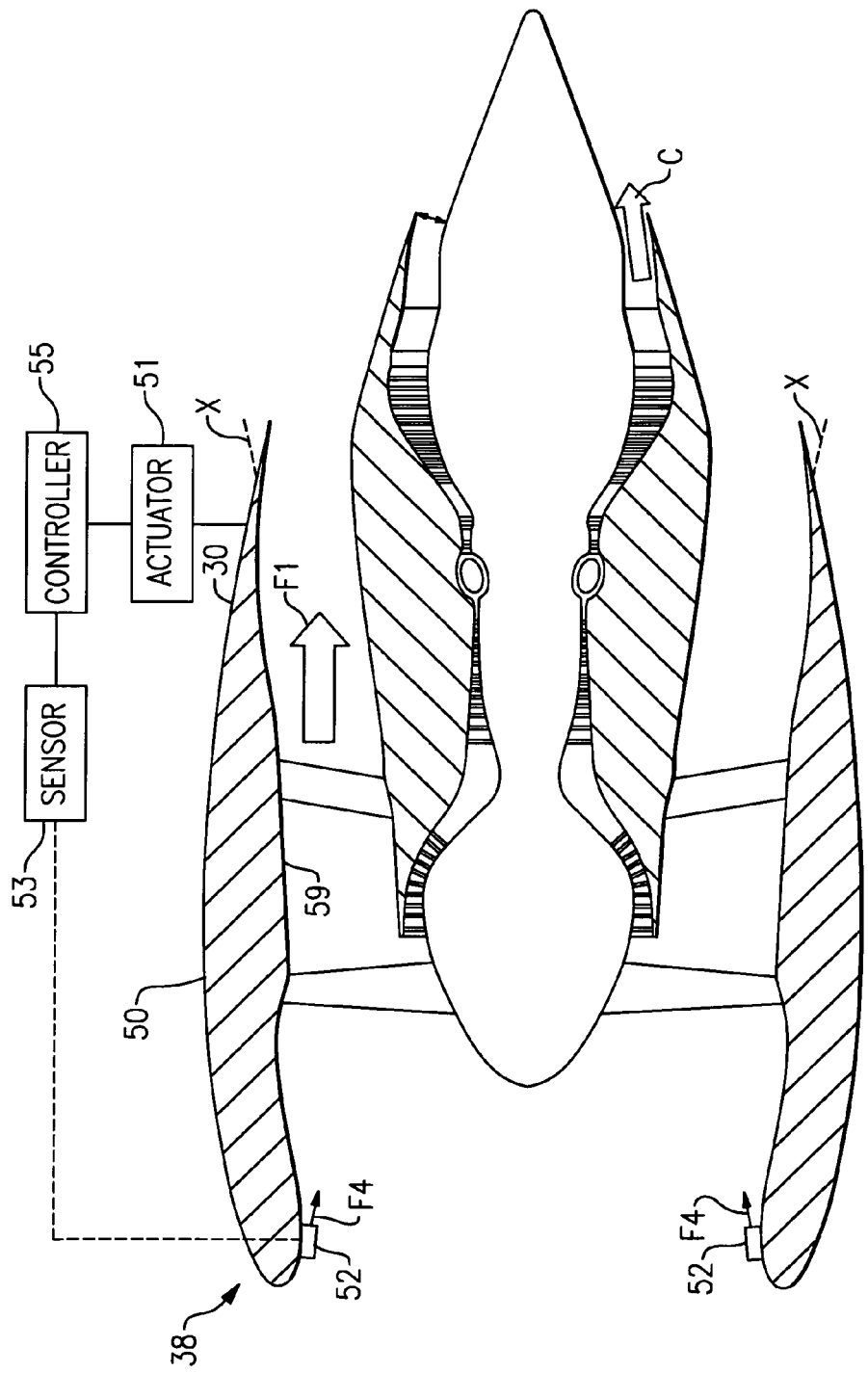
FIG. 4 illustrates a gas turbine engine having a VAFN and a first boundary layer control device.

Referring to FIG. 4, a slim-line nacelle 50 is illustrated which includes a first boundary layer control device 52 in addition to the VAFN 30. The slim line nacelle 50 offers additional nacelle drag and weight benefits over the nacelle assembly 26. The first boundary layer control device 52 is positioned at the inlet lip section 38 of the slim line nacelle 50. The first boundary layer control device 52 introduces an airflow F4 near the inlet lip section 38 in a direction defined by an intake airflow F3 prior to the onset of separation of the fan discharge airflow F1 from the interior wall 59 of the slim line nacelle 50. The first boundary layer control device 52 addresses any distortion associated with the fan discharge airflow F1 as the fan discharge airflow F1 is communicated from an upstream end of the engine 10 toward the downstream end.

The first boundary layer control device 52 may introduce the airflow F4 by injection or suction of airflow near the inlet lip section 38. For example, fluid injection jet devices (for injection of airflow) or blowing slots (for suction of airflow) may be provided near the inlet lip section 38 to introduce the airflow F4. It should be understood that the nacelle may include any known boundary layer control technology.

The first boundary layer control device 52 is actuated to generate the airflow F4 in response to detection of at least one operability condition. The operability condition is detected by the sensor 53. The sensor 53 communicates the detection of the operability condition to the controller 55, which then actuates the first boundary layer control device 52 to generate the airflow F4. A person of ordinary skill in the art would understand how to program the sensor 53 and the controller 55 for performing these functions.

In one example, the operability condition includes a static condition. Static conditions occur at low speeds (i.e., just prior to take-off). In another example, the operability condition includes a cross-wind condition. Cross-wind conditions are experienced during takeoff as the aircraft travels down the runway (i.e., where the aircraft experiences airflow in a roughly perpendicular direction with respect to the movement of the aircraft down the runway). In yet another example, the operability condition includes a high angle of attack condition. High angle of attack conditions are experienced where the aircraft is traveling at low speeds and the angle of incidence of the airflow relative to the inlet lip section 38 of the slim line nacelle 50 is relatively large. It should be understood that first boundary layer control device 52 may be controlled during any operability condition experienced by an aircraft during operation.

In addition, the discharge airflow area 36 of the VAFN 30 may be increased simultaneously with the generation of the airflow F4 by the first boundary layer control device 52 during the operability conditions to achieve further weight and drag reductions. In one example, both the VAFN 30 and the boundary layer control device 52 are utilized during all static conditions, cross-wind conditions, and high angle of attack conditions. The controller 55 is programmable to move the VAFN 30 to a position representing approximately 10% of its opening capability during cross-wind conditions and high angle of attack conditions, and to approximately 20% of its opening capability during static conditions. The first boundary layer control device 52 is turned off during windmilling conditions and during normal cruise operation of the aircraft to achieve optimal performance.

The first boundary layer control device 52 and the VAFN 30 may be utilized simultaneously during the operability conditions to achieve a nacelle having a reduced contraction ratio while maintaining non-separation of the fan discharge airflow F1 from the interior wall 59 of the slim line nacelle 50. Therefore, corresponding weight and drag benefits are achieved by the slim-line nacelle 50.

Figure 5:
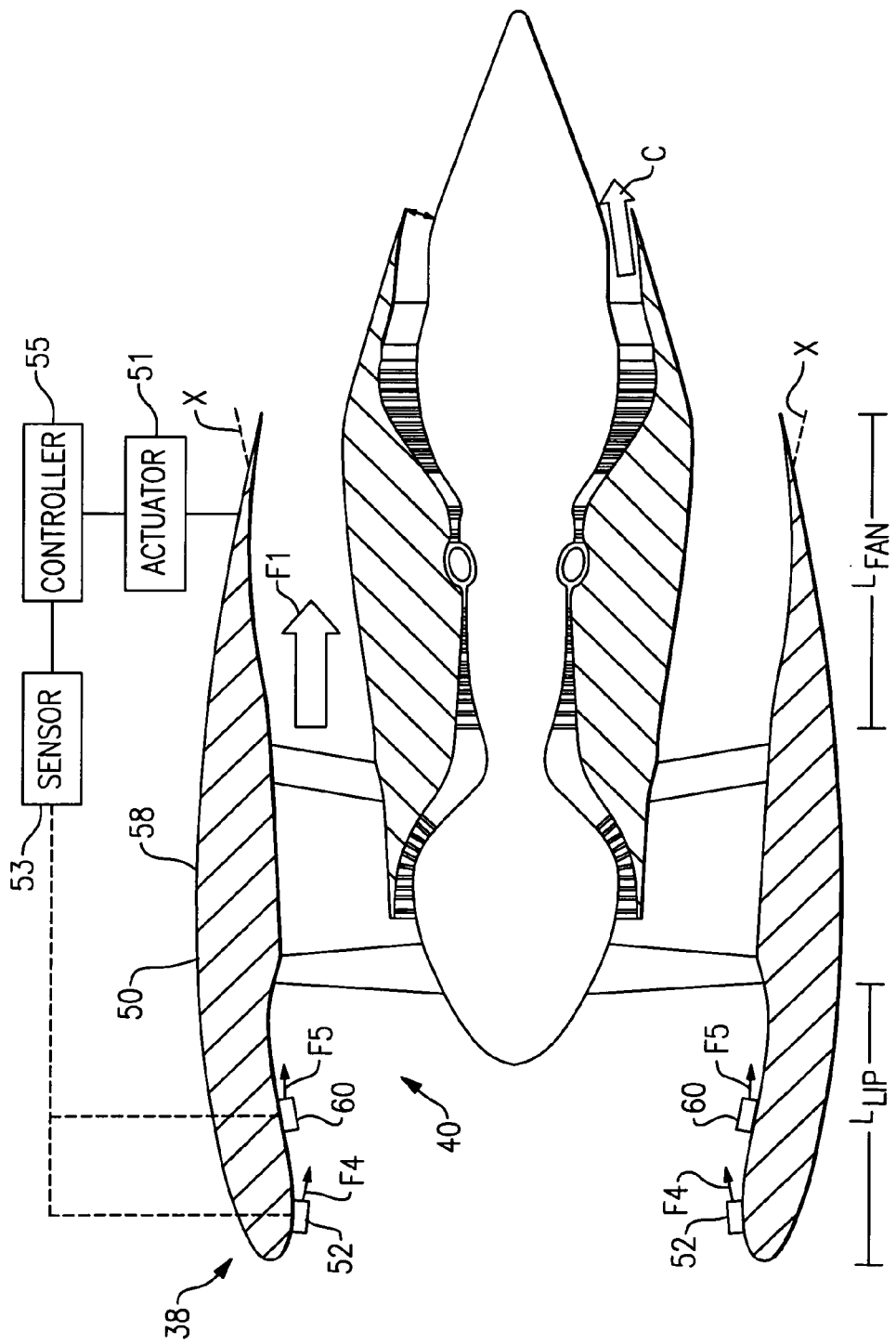
FIG. 5 illustrates a gas turbine engine having a VAFN, a first boundary layer control device and a second boundary layer control device for achieving a slim line nacelle.

Referring to FIG. 5, a second slim-line nacelle 58 is illustrated. The nacelle 58 includes a second boundary layer control device 60 in addition to the first boundary layer control device 52 and the VAFN 30. The second boundary layer control device 60 is identical to the configuration of the first boundary layer control device 52 except that the second boundary layer control device 60 is positioned downstream from the first boundary layer control device and near the inlet internal diffuser section 40. The second boundary layer control device 60 generates an airflow F5 at the inlet internal diffuser section 40 to prevent separation of the fan discharge airflow F1 from the interior wall 59 near this area of the nacelle 58.

The second boundary layer control device 60 is actuated by the controller 55 in response to detection of at least one operability condition. In one example, the second boundary layer control device 60 is utilized to generate the airflow F5 during static conditions, cross-wind conditions, and high angle of attack conditions. Utilization of the second boundary layer control device 60 at the inlet internal diffuser section 40 of the nacelle 58 enables a reduction in the inlet lip length $L_{lip}$ and the fan duct length $L_{fan}$, thereby enabling a weight reduction in the nacelle design. The second boundary layer control device 60 is shut off during windmilling conditions and during normal cruise operation of the aircraft.

In one example, the VAFN 30, the first boundary layer control device 52, and the second boundary layer control device 60 are exploited simultaneously during at least one of the operability conditions. In another example, the VAFN 30, the first boundary layer control device 52 and the second boundary layer control device 60 are simultaneously utilized during all static conditions, cross-wind conditions and high angle of attack conditions which are detected by the sensor 53. The slim-line nacelle 58 achieves further drag reduction benefits in response to the simultaneous utilization of all three technologies during diverse flight requirements.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

What is claimed is:

1. A nacelle assembly for a gas turbine engine, comprising:
   a nacelle defined about an axis and having an inlet lip section and an inlet internal diffuser section;
   a variable area fan nozzle positioned adjacent an aftmost segment of said nacelle, said variable area fan nozzle being moveable between a first position having a first discharge airflow area and a second position having a second discharge airflow area greater than said first discharge airflow area;
   at least one sensor that detects a windmilling condition of said gas turbine engine; and
   a controller in communication with said at least one sensor, wherein said controller moves said variable area fan nozzle from said first position to said second position in response to the detection of said windmilling condition.

2. The nacelle assembly as recited in claim 1, further comprising a core cowl at least partially within a fan cowl of said nacelle, wherein said first discharge airflow area and said second discharge airflow area are defined between an inner surface of said fan cowl and an outer surface of said core cowl.

3. The nacelle assembly as recited in claim 1, further comprising a first boundary layer control device positioned near said inlet lip section, wherein said first boundary layer control device is actuated by said controller in response to detection of at least one operability condition.

4. The nacelle assembly as recited in claim 3, further comprising a second boundary layer control device positioned downstream of said first boundary layer control device and near said inlet internal diffuser section, wherein said second boundary layer control device is actuated by said controller in response to detection of said at least one operability condition.

5. The nacelle assembly as recited in claim 4, wherein said variable area fan nozzle is moved to said second position simultaneously with the actuation of said first boundary layer control device and said second boundary layer control device in response to detection of said at least one operability condition, wherein said at least one operability condition includes at least one of a static condition, a cross-wind condition and a high angle of attack condition.

6. A gas turbine engine system, comprising:
   a nacelle defined about an axis and having an inlet lip section and an inlet internal diffuser section, wherein said nacelle includes a variable area fan nozzle moveable to influence a discharge airflow area of said nacelle;
   a core cowl at least partially within a fan cowl of said nacelle;
   at least one boundary layer control device positioned near at least one of said inlet lip section and said inlet internal diffuser section;
   a turbofan positioned within said nacelle;
   at least one compressor and at least one turbine positioned downstream of said turbofan;
   at least one combustor positioned between said at least one compressor and said at least one turbine;
   at least one sensor that produces a signal representing a windmilling condition; and
   a controller that receives said signal, wherein said controller selectively moves said variable area fan nozzle in response to receiving said signal.

7. The system as recited in claim 6, wherein said variable area fan nozzle includes at least one flap assembly, said at least one flap assembly moveable between a first position having a first discharge airflow area and a second position having a second discharge airflow area greater than said first discharge airflow area.

8. The system as recited in claim 7, comprising an actuator assembly in communication with said controller and operable to move said at least one flap assembly between said first position and said second position.

9. The system as recited in claim 6, wherein said at least one boundary layer control device includes a first boundary layer control device and a second boundary layer control device, said first boundary layer control device positioned near said inlet lip section and said second boundary layer control device positioned near said inlet internal diffuser section, wherein said inlet internal diffuser section is downstream from said inlet lip section.

10. The system as recited in claim 9, wherein said first boundary layer control device and said second boundary layer control device are actuated by said controller in response to detection of an operability condition, wherein the actuation of said first boundary layer control device and said second boundary layer control device includes at least one of injection of airflow within said nacelle and suction of airflow within said nacelle.

11. The system as recited in claim 10, wherein said operability condition includes at least one of a static condition, a cross-wind condition, and a high angle of attack condition.

12. The system as recited in claim 10, wherein said variable area fan nozzle is moveable simultaneously with the actuation of said first boundary layer control device and said second boundary layer control device in response to detection of said operability condition.

13. The system as recited in claim 6, wherein said variable area fan nozzle is positioned near an aftmost segment of said nacelle.

14. The system as recited in claim 6, wherein said windmilling condition comprises an engine out condition during flight subsequent to take-off.

* * * * *